(12) United States Patent
Loesch et al.

(10) Patent No.: US 11,362,433 B2
(45) Date of Patent: Jun. 14, 2022

(54) RADAR SENSOR HAVING A PLURALITY OF MAIN BEAM DIRECTIONS

(71) Applicant: Robert Bosch GmbH, Stuttgart (DE)

(72) Inventors: Benedikt Loesch, Stuttgart (DE); Klaus Baur, Mietingen (DE); Marcel Mayer, Lonsee (DE); Mehran Pourmousavi, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 16/650,356

(22) PCT Filed: Sep. 12, 2018

(86) PCT No.: PCT/EP2018/074661
§ 371 (c)(1),
(2) Date: Mar. 24, 2020

(87) PCT Pub. No.: WO2019/081119
PCT Pub. Date: May 2, 2019

(65) Prior Publication Data
US 2020/0243983 A1    Jul. 30, 2020

(30) Foreign Application Priority Data

Oct. 27, 2017    (DE) .......................... 102017219372.7

(51) Int. Cl.
*H01Q 19/06*    (2006.01)
*G01S 7/03*    (2006.01)
(Continued)

(52) U.S. Cl.
CPC ........... *H01Q 19/062* (2013.01); *G01S 7/032* (2013.01); *G01S 13/003* (2013.01); *G01S 13/931* (2013.01); *H01Q 1/3233* (2013.01)

(58) Field of Classification Search
CPC ...... H01Q 15/02; H01Q 19/06; H01Q 25/007; H01Q 25/008; G01S 13/931
See application file for complete search history.

(56) References Cited

U.S. PATENT DOCUMENTS

| 2,736,894 | A | * | 2/1956 | Kock | ..................... H01Q 15/02 343/756 |
| 3,755,815 | A | * | 8/1973 | Stangel | ..................... H01Q 3/46 343/754 |

(Continued)

FOREIGN PATENT DOCUMENTS

DE    19961774 A1    7/2001

OTHER PUBLICATIONS

International Search Report for PCT/EP2018/074661, dated May 21, 2019.

(Continued)

*Primary Examiner* — Peter M Bythrow
(74) *Attorney, Agent, or Firm* — Norton Rose Fulbright US LLP; Gerard Messina

(57) ABSTRACT

A radar sensor having a plurality of main beam directions, and having a circuit board on which one or a plurality of antenna elements for transmitting and/or receiving of the radar radiation is/are situated. In addition, the radar sensor has at least one or a plurality of dielectric lenses which is/are situated in the optical path of the antenna elements, the optical axis of the dielectric lens being tilted in relation to the main beam direction of the at least one or the plurality of antenna elements under an angle that is greater than zero degrees so that at least one main beam direction of the radar sensor is fixed at a predefined angle to the vertical of the circuit board surface.

11 Claims, 3 Drawing Sheets

(51) Int. Cl.
*G01S 13/00* (2006.01)
*G01S 13/931* (2020.01)
*H01Q 1/32* (2006.01)

(56) References Cited

U.S. PATENT DOCUMENTS

| | | | | |
|---|---|---|---|---|
| 3,833,909 A * | 9/1974 | Schaufelberger | H01Q 3/14 | 343/754 |
| 3,936,835 A * | 2/1976 | Phelan | H01Q 19/17 | 343/753 |
| 4,187,507 A * | 2/1980 | Crane | H01Q 21/0006 | 343/754 |
| 4,381,509 A * | 4/1983 | Rotman | H01Q 3/245 | 343/754 |
| 4,825,216 A * | 4/1989 | DuFort | H01Q 3/2658 | 342/372 |
| 5,977,904 A * | 11/1999 | Mizuno | H01Q 1/3233 | 342/70 |
| 6,246,375 B1 * | 6/2001 | Yamada | H01Q 3/14 | 343/753 |
| 6,281,853 B1 * | 8/2001 | Caille | H04B 7/18571 | 343/753 |
| 6,362,795 B2 * | 3/2002 | Ishikawa | H01Q 19/062 | 343/753 |
| 6,563,477 B2 * | 5/2003 | Ishikawa | G01S 7/032 | 343/753 |
| 6,822,612 B2 * | 11/2004 | Takimoto | H01Q 3/14 | 343/754 |
| 7,482,990 B2 * | 1/2009 | Fujii | H01Q 1/3233 | 343/909 |
| 7,605,768 B2 * | 10/2009 | Ebling | H01Q 1/3233 | 343/754 |
| 2001/0013842 A1 * | 8/2001 | Ishikawa | G01S 13/931 | 343/773 |
| 2002/0067314 A1 * | 6/2002 | Takimoto | H01Q 1/3233 | 343/711 |
| 2004/0108963 A1 * | 6/2004 | Clymer | H01Q 1/28 | 343/837 |
| 2008/0048921 A1 * | 2/2008 | Rebeiz | H01Q 1/3233 | 343/754 |
| 2009/0267822 A1 * | 10/2009 | Shinoda | G01S 13/4463 | 342/70 |
| 2012/0013516 A1 * | 1/2012 | Ahn | H01Q 25/007 | 343/837 |
| 2016/0276747 A1 * | 9/2016 | Davis | H01Q 25/007 | |
| 2017/0040705 A1 * | 2/2017 | Matitsine | H01Q 15/02 | |
| 2017/0317809 A1 * | 11/2017 | Khandani | H01Q 1/36 | |
| 2018/0269576 A1 * | 9/2018 | Scarborough | H01Q 19/062 | |
| 2019/0317210 A1 * | 10/2019 | Fillion | G01S 13/862 | |

OTHER PUBLICATIONS

Evans, R. J. et al., "Consumer Radar: Technology and Limitations", 2013 International Conference on Radar, IEEE, 2013, pp. 21-26. XP032519500.

* cited by examiner

RADAR SENSOR HAVING A PLURALITY OF MAIN BEAM DIRECTIONS

FIELD OF THE INVENTION

The present invention relates to a radar sensor having a plurality of main beam directions, the radar sensor including a circuit board on which an antenna element or a plurality of antenna elements for transmitting and/or receiving the radar radiation are situated. In addition, the radar sensor has at least one dielectric lens or a plurality of dielectric lenses or a lens having a plurality of partial lenses, which is situated in the optical path of the antenna elements, the optical axis of the dielectric lens or the dielectric partial lens being tilted in relation to the main beam direction of the at least one antenna element or the plurality of antenna elements under an angle that is greater than zero degrees, so that at least one main beam direction of the radar sensor is fixed at a predefined angle relative to the perpendicular of the circuit board surface.

BACKGROUND INFORMATION

From the document DE 199 61 774 A1, a device is discussed for adjusting a directional beam system, which has a base including at least one beam source, at least three support elements, which are used to keep the base in place on a carrier, and the at least three support elements are selectively variable in their respective length independently of one another in order to vary the distance of the at least one beam source from a focusing arrangement and to vary the alignment of the at least one beam source relative to the focusing arrangement.

SUMMARY OF THE INVENTION

An important aspect of the present invention is the realization of a radar sensor which has antenna elements on a planar circuit board and generates, with the aid of dielectric lenses, one or a plurality of main beam direction(s), which has or have directions that deviate from the normal of the circuit board, so that such a sensor installed in a motor vehicle is able to monitor the environment in a plurality of directions.

According to the present invention, this is achieved by the features described herein. Advantageous further developments and refinements result from the further descriptions herein.

In an advantageous manner, the antenna element or the plurality of antenna elements provided on the circuit board is/are configured as planar antennas, in particular in the form of patch antennas. Planar antennas, in particular patch antennas, are advantageously realizable very cost-effectively in a very flat and compact design.

A main beam direction of the radar sensor describes the direction of the greatest beam bundling outside the radar sensor. The main beam direction of the antenna element is oriented in the normal direction with respect to the surface of the circuit board, in particular when the antenna element is realized as a patch antenna. In this case the main beam direction of the antenna element or the plurality of antenna elements is configured perpendicular to the circuit board surface and thus has the same orientation as the direction of the antenna normal. This main beam direction of the antenna element or the plurality of antenna elements is not to be confused with the main beam direction of the radar sensor.

The tilting angle according to the main description herein should not be confused with the tilting angle of the main beam direction in a system without a dielectric lens. The tilting angle is the angle about which the optical axis of the dielectric lens is tilted relative to the normal of the circuit board or the antenna normal. The tilting of the main beam direction of the radar sensor is a function of this tilting angle but not identical to it.

It is advantageously provided that the predefined angle of the at least one main beam direction of the radar sensor is predefined by the tilting angle of the optical axis of the at least one dielectric lens relative to the at least one antenna normal.

In addition, it is advantageous that the predefined angle of the at least one main beam direction of the radar sensor is predefined by the distance of the at least one antenna element to the vertical plumb line of the circuit board which extends through the lens center. The lens center is the point at which the optical axis of the lens crosses the center point of the dielectric lens. If a straight line that is located at a right angle to the circuit board is projected through this lens center and if the lateral distance on the circuit board surface to the point at which the optical axis of the dielectric lens intersects the circuit board is ascertained, then distance a is obtained.

In addition, it is advantageous that two lenses are provided as dielectric lenses, whose optical axes in the lateral direction are tilted in opposite directions with respect to the antenna normal or the plurality of antenna normals and the resulting main beam directions of the radar sensor in the lateral direction are thus aligned in different directions in space relative to the antenna normal or the plurality of antenna normals. Defined as lateral directions to the antenna normal or the plurality of antenna normals are thus the directions that are oriented parallel to the circuit board surface. Because of this advantageous further development, it is provided that the main beam directions of the radar sensor are aligned in laterally opposite directions, this lateral alignment defining the parallel alignment to the circuit board surface.

In addition, it is advantageous that the at least one lens or the plurality of lenses is configured as one or more cylinder lenses. Because of the development of the dielectric lenses as cylinder lenses, it is possible to provide main beam directions of the sensor that are not only lobe-shaped but may be configured similar to a pivotable plane in space. Toward this end, the axial longitudinal axes of the one cylinder lens or the plurality of cylinder lenses have to be aligned perpendicular to the main beam direction of the at least one antenna element or the plurality of antenna elements, so that the longitudinal axes of the cylinder lenses are aligned parallel to the circuit board surface of the radar sensor.

It is furthermore advantageous that two cylinder lenses are provided as lenses and positioned in such a way that their axial longitudinal axes are aligned parallel to each other. This development makes it possible to design a radar sensor which, starting from the antenna normal, has two lobes or two main beam planes which are tilted in opposite directions starting from the antenna normal.

It is also advantageous that the at least one sensor element or the plurality of sensor elements for transmitting and/or receiving is/are configured as serially fed array antennas. In a particularly advantageous manner, a feeder line of the serially fed antenna array is provided in this case, which is situated parallel to the axial longitudinal axis of the at least one cylinder lens or the two cylinder lenses on the circuit board surface.

Moreover, it is advantageous that the radar sensor has a reflector between the at least one antenna element and the at least one dielectric lens or partial lens. This reflector may particularly be situated between the circuit board and the edge section of the dielectric lens most remote from the circuit board. This makes it possible to nevertheless utilize the components of the transmitted and received radiation that the lens is no longer able to focus because of the tilted lens orientation, i.e. through a reflection at the reflector.

Furthermore, it is possible to avoid interfering with the main beam direction of the adjacent dielectric lens. The reflector has to be aligned in such a way that, in the lateral direction, the normal vector of the reflector surface with respect to the main beam direction of the antenna element or the plurality of antenna elements is oriented in opposition to the lateral direction of the main beam direction of the radar sensor. Reflected partial beams are ideally reflected in such a way that the reflected partial beams extend parallel to the main beam direction of the radar sensor following a diffraction by the dielectric lens. The reflector advantageously has a metallic surface or is made of metal.

In addition, it is advantageous that the dielectric lens or the plurality of dielectric lenses is/are configured as Fresnel lenses. In addition, it may be advantageous that the radar sensor has two or more transmitting antennas according to the described invention and a bistatic receiving antenna or a plurality of bistatic receiving antennas is provided in addition, which is/are situated on the circuit board in such a way that these receiving antennas have no dielectric lens in their optical path. When the method according to the present invention is realized in the form of a bistatic sensor, i.e. a radar sensor in which different antennas are used for transmitting the radar beams and for receiving the radar beams, then it may be advantageous that only the transmitting antennas are configured according to the present invention and the receiving antennas are situated outside the focus of the dielectric lenses and thus detect unfocused received radiation. This makes it possible for the system as a MIMO (Multiple-In-Multiple-Out) system, so that the virtual aperture of the antenna is enlarged, and better resolution of the sensor is obtained as a result.

Moreover, it is advantageous that a plurality of the receiving antennas is situated along a line. In a particularly advantageous manner, the alignment of the line is such that it is aligned in the azimuth direction of the radar sensor. This makes it possible to achieve an angular resolution of the received signals in the azimuth direction of the radar sensor with the aid of the receiving antennas and thus to ascertain the receiving direction of the detected objects with high accuracy. By placing the receiving antennas along a line for measuring the azimuth angle, the run-time differences of the received signals at the individual receiving antennas are evaluated, and an azimuth angle of the incident received waves is determined based on the phase difference of the signals.

In the described lens concept, the pivot angle is largely independent of the frequency and of circuit board tolerances because the pivot direction is primarily achieved through the geometrical positioning and the tilting angle of the lens system.

This results in a considerably greater utilizable bandwidth of the antenna in comparison to conventional systems because the bandwidth for the production tolerances caused by process lot variations need no longer be held in readiness but may actually be utilized in the modulation. In addition, considerably simpler patch elements are able to be used as antenna elements, which allow for greater bandwidths by their basic design alone when compared to large-surface planar array structures.

Additional features, application options and advantages of the present invention result from the following description of exemplary embodiments of the present invention, which are depicted in the figures of the drawing. All described or illustrated features form the subject matter of the present invention, either on their own or in any combination, regardless of their combination as described herein, their antecedent reference and also regardless of their wording or representation in the description or the drawing.

In the following text, exemplary embodiments of the present invention are described on the basis of the drawings.

DETAILED DESCRIPTION

Figure 1:
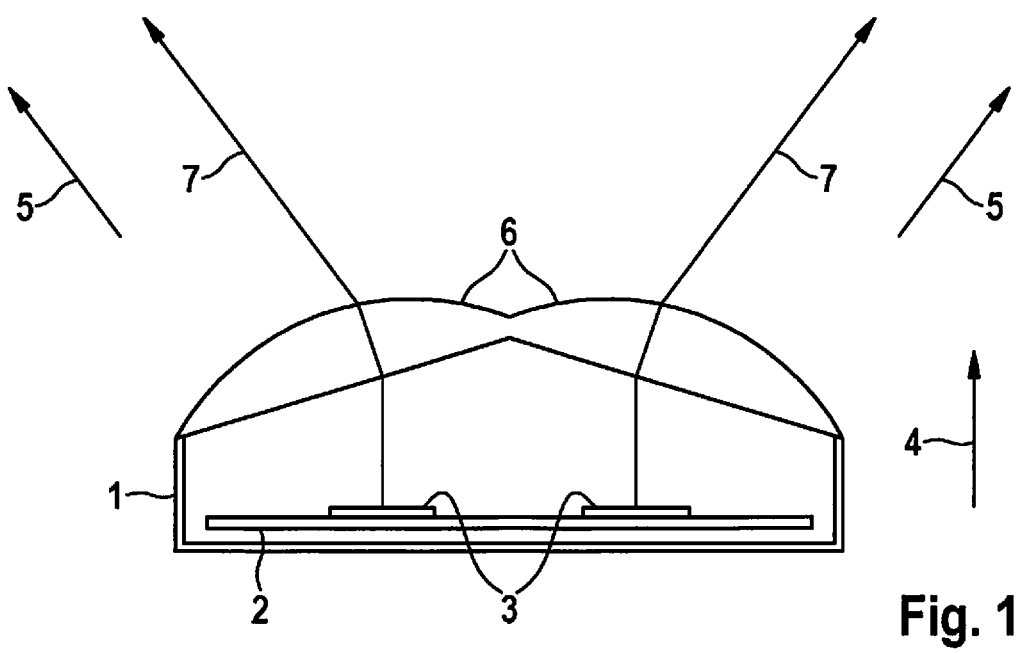
FIG. 1 shows a schematic sectional representation of the radar sensor according to the present invention in the transverse direction.

FIG. 1 shows a schematic cross-sectional representation of the radar sensor according to the present invention. A bowl-shaped housing 1 of the radar sensor can be seen, which has a base and side walls. This bowl-shaped housing 1 is open toward the top and restricted in the upward direction by dielectric lens 6 or dielectric lenses 6. A circuit board 2 is situated in housing 1 of the radar sensor. In addition to electrical components for signal processing, the voltage supply as well as the communication with other electrical devices, circuit board 2 includes antennas 3 of the radar sensor. The antennas, which are configured as at least one antenna element 3 or a plurality of antenna elements 3 and in particular may be antennas for transmitting, are configured in the form of planar antennas in this instance. Planar antennas are frequently configured as a metal layer on the surface of circuit board 2. This results in a main beam direction of antenna element 3 in the direction of antenna normal 4 as the direction of the strongest emission of the electromagnetic waves arising in a perpendicular direction with respect to the surface of circuit board 2 on which the at least one antenna element 3 is fixed in place. In a development of a sensor with a plurality of antenna elements 3, these direct radiation directions of antenna elements 3 are still aligned parallel to one another and parallel to antenna normal 4 prior to passing through dielectric lens 6 or dielectric lenses 6. Since a plurality of antenna elements 3 as well as a plurality of dielectric lenses 6 is/are able to be used, it is possible that the radiation directions, which were initially aligned in parallel in the pivot direction, are diffracted in different directions by the differently oriented dielectric lenses 6 or the differently oriented parts of dielectric lenses 6. By tilting dielectric lenses 6 or subregions 6 of the dielectric lens, it is possible that transmitted beams 7, having passed through dielectric lens 6 or subregions 6 of the dielectric lens, are oriented in different directions 7, which constitute main beam directions 5 of the radar sensor. Main beam directions 5 of the radar sensor are influenced by the tilting of dielectric lens 6, whereby the tilting of dielectric lenses 6 or of subregions 6 of the dielectric lens in opposite directions relative to antenna normal 4 results in main beam directions 5 that are likewise tilted in opposite directions in space. For example, this makes it possible to realize a radar sensor which is able to be fixed in place on a side of a motor vehicle and is able to detect the lateral region of the vehicle both in the driving direction and counter to the driving direction. In addition, it may be particularly advantageous to use such a sensor on a corner of the vehicle so that both the region to the side of the vehicle and toward the rear of the vehicle or the regions to the side of the vehicle and in front of the vehicle are able to be monitored at the same time. This makes it possible to realize a particularly large detection range using a single sensor, and also to achieve a particularly high resolution of the received signals.

Figure 2:
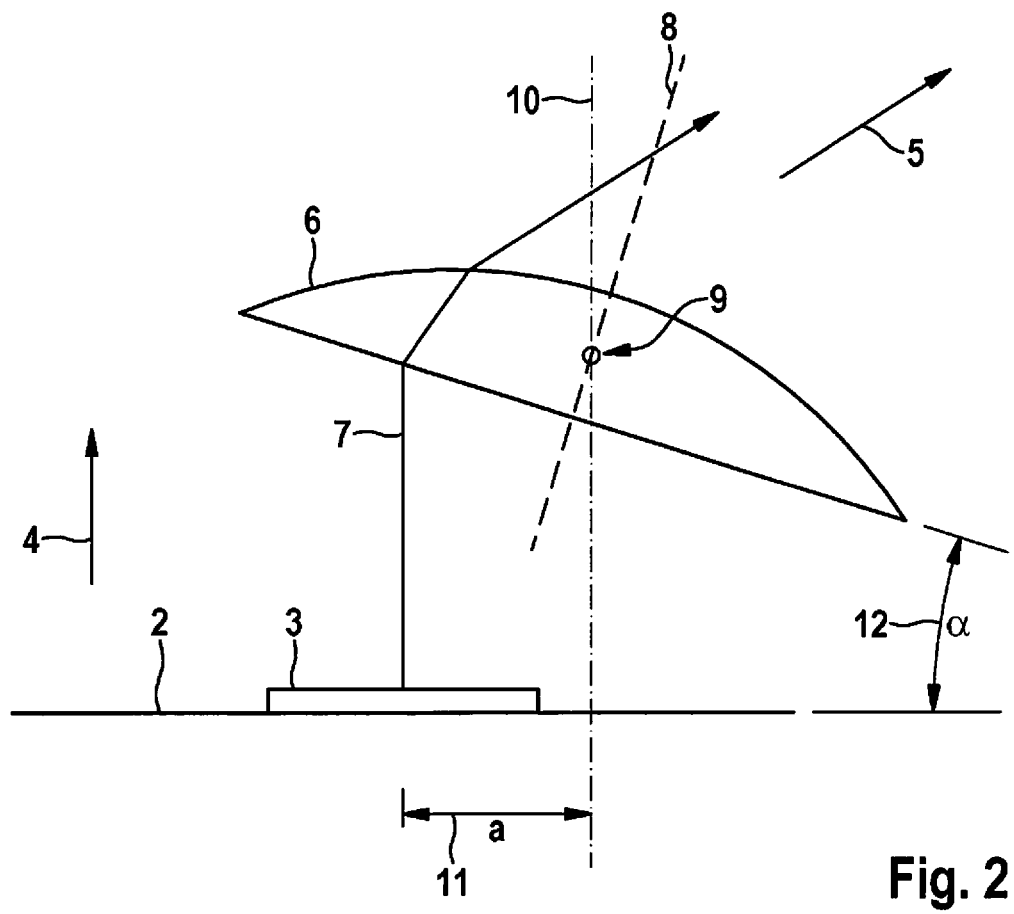
FIG. 2 shows a schematic sketch of the method of functioning of the sensor according to the present invention.

FIG. 2 shows the principle of FIG. 1 once again in greater detail. For reasons of simplification, housing 1 of the radar sensor has not been depicted. Circuit board 2 is visible on whose surface an antenna element 3 is mounted, which, for instance, may be configured as a planar antenna, in particular a patch antenna. This antenna element 3 radiates an electromagnetic wave as a transmitted signal in an unfocused manner in the direction of antenna normal 4. In the further course, this optical path 7 of the radar radiation impinges upon dielectric lens 6 by which optical path 7 is diffracted multiple times. Dielectric lens 6 has an optical axis 8 which defines the lens axis. Situated in the area of optical axis 8 in the intersection with lens 6 is lens center 9. The tilting of main beam direction 5 of the radar sensor in relation to antenna normal 4 essentially results from distance 11, which hereinafter is also denoted as a, and from tilting angle 12 about which optical axis 8 of dielectric lens 6 is tilted and which will be denoted as alpha hereinafter. To simplify FIG. 2, a perpendicular 10 has been drawn in, which is oriented perpendicular to the circuit board surface, i.e. in the direction of antenna normal 4, and defined by optical center 9 of the dielectric lens. This perpendicular 10 intersects the circuit board surface of circuit board 2 at a point that is at a distance a from the center of antenna element 3. This distance a 11 as well as tilting angle alpha 12 about which the optical axis of the dielectric lens is tilted relative to antenna normal 4 or perpendicular 10 influence the angle of main beam direction 5 of the radar sensor to a significant extent. When the radar sensor is configured to include more than one transmitting antenna, it is also possible to provide different distances a 11 and/or different tilting angles alpha 12 for the individual antenna elements 3 and/or the individual dielectric lenses 6 or subregions 6 of the dielectric lens and to thereby adapt main beam directions 5 of the radar sensor according to the requirements.

Figure 3:
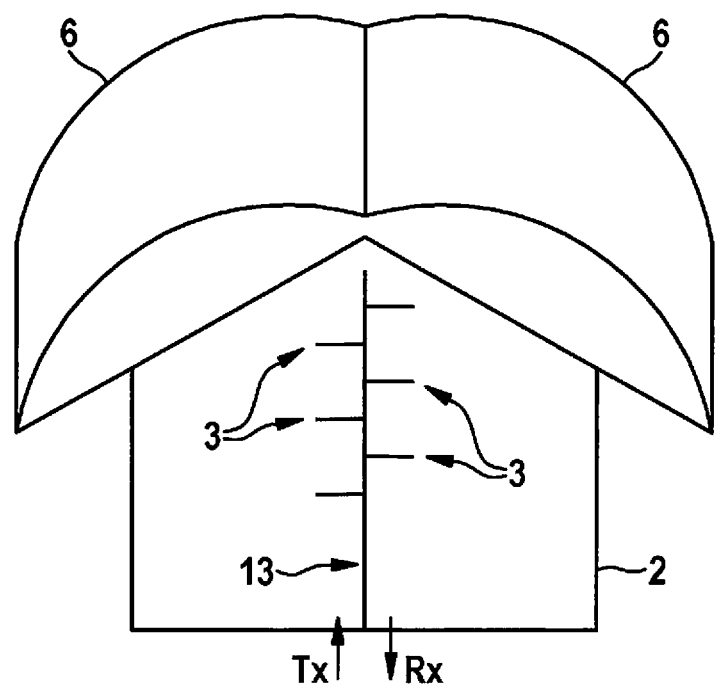
FIG. 3 shows a schematic sectional representation in the transverse direction of the specific embodiment when using cylinder lenses.

In FIG. 3, the sensor according to the present invention is shown in a particularly advantageous development. Once again, circuit board 2 can be seen, which is shown in a perspective view. A feeder line 13 is shown on this circuit board 2, which forms the connection line to antenna structure 3. Via this connection line 13, transmitted signals Tx are supplied to antenna structure 3 and possibly received signals Rx from the receiving antenna are forwarded to the evaluation devices. For example, the antenna elements may be configured as series-fed patch antennas. Two cylinder lenses 6 are provided parallel to the alignment of connection line 13, which are tilted relative to each other and with respect to antenna normal 4. Such an embodiment creates two antenna columns, each being made up of antenna elements 3, i.e. once on the left side of feeder line 13, and once on the right side of feeder line 13. These two antenna rows are allocated to the two cylinder lenses 6, which thus form two main beam directions 5 of the radar sensor according to the method of functioning illustrated in FIG. 1.

Because of this embodiment of FIG. 3, it is possible to form two main beam directions 5 using a single antenna feeder line, which detect different directions in space. When cylinder lenses and a series array are used, it is possible two form two transmission and receiving levels so that the radar sensor is provided with a large detection range.

The lenses according to this specific embodiment have relatively small aperture widths so as to obtain a broader beam characteristic in the range of the main beam directions. Moreover, despite the lens system, the height of the antenna system remains relatively low due to the low focusing, e.g. only a few millimeters. A further reduction of the height is possible by using lens elements that have smaller focal distances or lenses featuring a Fresnel design. As a result, flat sensors are realizable despite the lens system.

Figure 4:
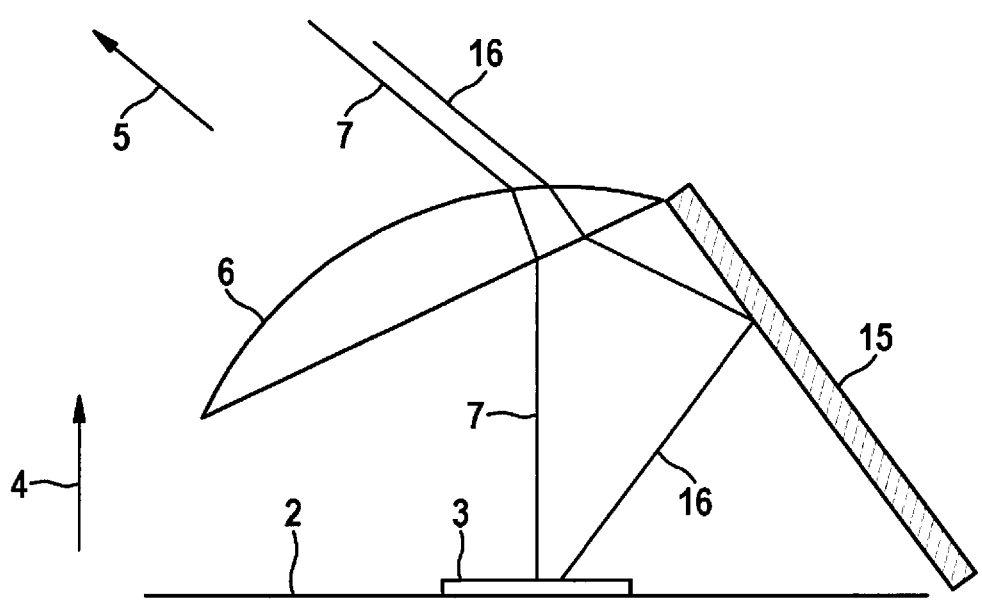
FIG. 4 shows a schematic sectional view in the transverse direction when using a reflector.

FIG. 4 describes a specific embodiment that resembles that of FIG. 2, but which has been supplemented by reflector 15. Once again, the depiction of housing 1 has been omitted in FIG. 4. To be seen is circuit board 2 on whose surface the at least one antenna element 3 or the plurality of antenna elements 3 is mounted. These antenna elements 3 transmit emitted beams in the direction of antenna normal 4 and have the highest energy density in the direction of optical path 7. This main beam direction 7 is diffracted by dielectric lens 6, whose optical axis 8 is tilted relative to antenna normal 4 at tilting angle 12 (alpha), thereby resulting in a main beam direction 5 of the radar sensor. Because of the tilting of dielectric lens 6, parasitic radiation according to optical path 16 may be emitted in an unfocused manner, which not only is lost to the detection in the direction of main beam direction 5 but may interfere with an adjacent optical path of the adjacent dielectric lens or dielectric partial lens. In order to avoid this and to further improve the sensor, a provided reflector 15 may be used, which particularly is able to be configured as a metallic reflector. This reflector is oriented in such a way that it extends between the edge region of dielectric lens 6 that is situated farthest from circuit board surface 2, and the region of circuit board surface 2 that is oriented counter to main beam direction 5 in the lateral direction with respect to antenna normal 4. This has the result that the emitted transmission output that is emitted in the direction of optical path 16 is reflected at reflector 15 and dielectric lens 6 is radiated in the direction of main beam direction 5 of the radar sensor. It is possible to orient reflector 15 in such a way that the propagation direction of the majority of the reflected and refracted transmission output along optical path 16 outside of the radar sensor takes place in the same direction as optical path 7 which was radiated along antenna normal 4. As an alternative, it is also possible for an antenna having a configured secondary maximum to radiate in the direction of optical path 16 so that main beam direction 5 and optical path 16 detect different directions in space outside of the radar sensor and thereby make it possible to illuminate different monitoring ranges by the principal maximum and the secondary maximum.

Figure 5:
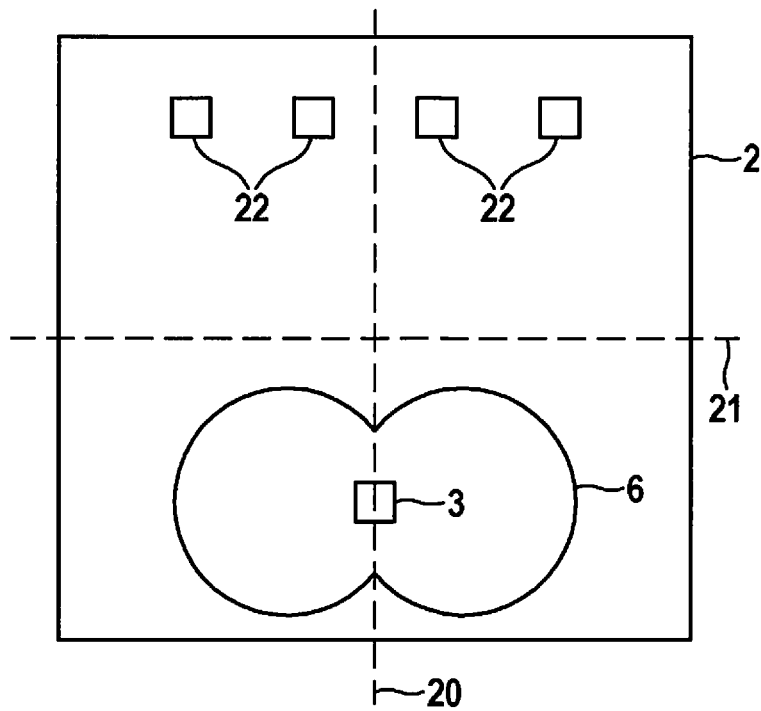
FIG. 5 shows a schematic representation of the positioning of the elements on the circuit board when the present invention is carried out in an exemplary MIMO system.

FIG. 5 shows a specific embodiment of the sensor in the form of a MIMO (Multiple-In-Multiple-Out) radar system having a transmission channel. In this connection, circuit board 2 is shown in a plan view, which is divided by a vertical axis of symmetry 20 as well as a horizontal axis of symmetry 21. Receiving antennas 22 are advantageously positioned at equidistant intervals along a horizontal line, which extends parallel to horizontal axis of symmetry 21. As a result of this placement of receiving antennas 22, the partial beams reflected at objects are able to evaluated with regard to their azimuth angle and the azimuth angles of the detected objects can thus be ascertained in a particularly precise manner. In the lower part of circuit board 2, the transmission range with a double lens structure is shown. This double lens structure has the described transmitting antenna system with a tilted lens system and a supplied transmission antenna 3. Transmitting antenna 3 and receiving antenna 22 are configured in planar technology, for instance. Double lens structure 6 ensures that transmitting antenna 3 has two main beam directions 5, which point out of the drawing plane and additionally are oriented both toward the left and the right with regard to vertical axis of symmetry 20. As a result, two main beam directions may be formed using only a single transmission channel so that a compact and advantageous sensor design is provided. Dielectric lenses 6, which are configured as double lens structure, are able to be configured in the form of double cylinder lenses 6 similar to what is shown in FIG. 3.

Figure 6:
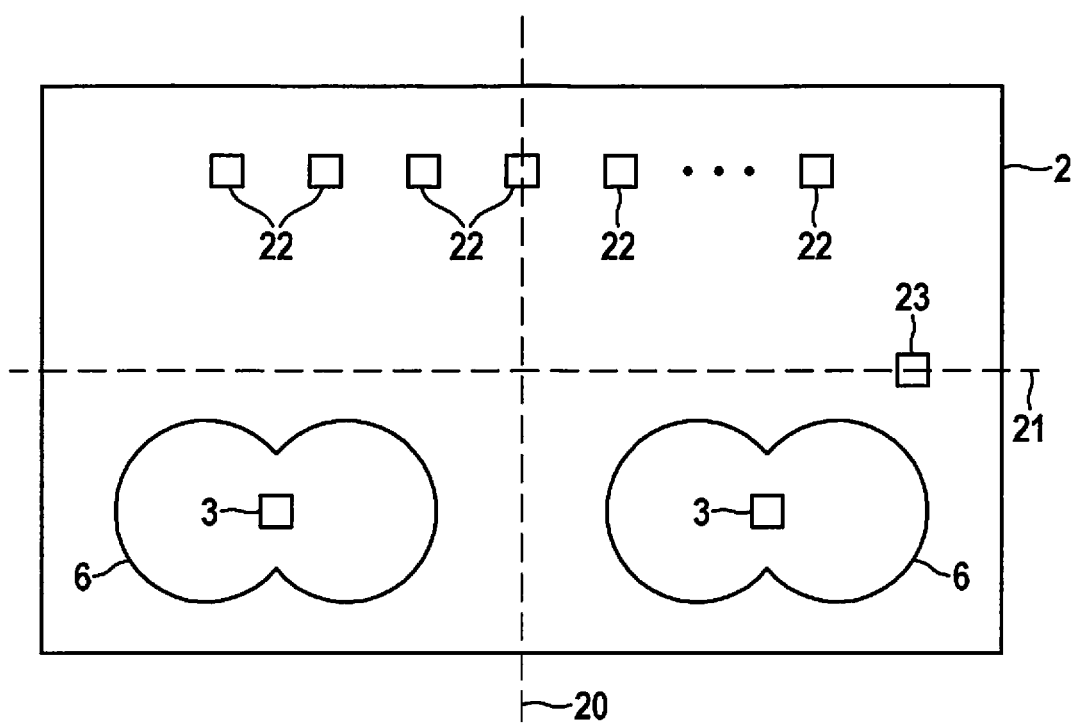
FIG. 6 shows a further schematic illustration of the positioning of the elements on the circuit board when the present invention is used within the framework of another exemplary MIMO system.

FIG. 6 shows another embodiment having two or more transmitting antennas 3 and identical radiation characteristics. When this more powerful MIMO system is used, two or more transmitting antennas are required that have identical radiation characteristics, if possible.

Once again, circuit board 2 is shown in a plan view. Antenna normal 4 is once more oriented perpendicular to the drawing plane as was the case in FIG. 5. The surface of circuit board 2 is again subdivided by a vertical axis of symmetry 20 and a horizontal axis of symmetry 21. Shown in the upper part of circuit board 2, i.e. above horizontal axis of symmetry 21, are once again receiving antennas 22, which are positioned along a horizontal line, but advantageously not necessarily at equidistant intervals, and thus are able to evaluate received signals in an especially accurate manner with regard to their azimuth angles. Depending on the capability of the receiving system, the number of these receiving antennas 22 may include a different number of individual patches. Two identical transmitting antennas are shown in the lower half of FIG. 6, a transmitting antenna structure on the left side of vertical axis of symmetry 20 and the other transmitting antenna structure on the right side next to vertical axis of symmetry 20. Each of these transmitting antennas is made up of a transmitting antenna 3, which may be configured as a patch antenna, for example, as well as a double lens structure 6, which generates two main beam directions 5 of the radar sensor from the transmitted signal of each transmitting antenna structures 3. In total, four main beam directions are generated by the structure shown in FIG. 6. In a variation of the structure according to FIG. 6, it is possible to develop double dielectric lenses 6 as double cylinder lenses in each case, similar to the description in FIG. 3. In this case, transmitting antennas 3 have to be configured as series-fed array antenna so that four transmission levels are generated in this case as well.

It is optionally possible to provide an additionally fed antenna 23 outside the dielectric lens structure, which has a broad main beam characteristic in the azimuth direction, i.e. in the horizontal direction with regard to the illustrated figure. This makes it possible to selectively illuminate further angular directions/ranges and to produce sensors that have detection ranges which are able to be adapted to customer specifications in a selective manner without any great expense.

The illustrated radar sensor structures are able to be supplemented by a non-focusing radome, e.g., a plastic cover, behind which the radar sensor is installed in a motor vehicle so that the sensor is not visible from outside even to an observer. The curvatures of the lenses may also point toward the inside in all described concepts. Focusing and beam-pivoting functions of the lenses thereby remain unchanged and will not be affected. Additional lens forms are also possible, e.g., stepped Fresnel lenses, whereby the quantity of plastic material for the lens is able to be reduced and the sensor device is consequently able to be produced in a cost- and weight-optimized manner.

Another advantage is the simple adaptation of the beam direction and the beam width to different requirements and customer-specific installation situations. This approach does not require a complex new development of the feeder network for the antenna supply on the circuit board for different variants, as in the case in planar concepts. An exchange of the radome for different lens geometries is sufficient for this purpose. This reduces the variant multitude in the circuit board to a minimum. In addition, the complexity of the design and the optimization expense are considerably reduced because of the known optical relationships in lens systems in comparison to complex distribution networks in the case of phase-controlled array structures. The configuration of the main beam direction is able to be carried out without an optimization already via a field simulation using simple, beam-optic laws of refraction. Customer-specific system specifications with regard to the detection range and installation situation in the vehicle are therefore easily and quickly adaptable. In addition, angular ranges that are tight for function-related reasons and which require large ranges are able to be focused in a selective manner.

In contrast to lenses for highly-focused remote range radar sensors, lower focusing is normally already sufficient to satisfy the average range requirements in the case of lateral radar sensors. The use of compact lens elements having a small aperture and focal length is therefore sufficient for realizing very flat sensors despite the use of a lens system.

Various geometries such as rotation-symmetrical, cylinder-shaped or elliptical lenses are able to be used in this context. In addition, various antennas for supplying the lens may be used. This may be individual patches or patch arrays, for example.

What is claimed is:
1. A radar sensor comprising:
a circuit board;
an array of a plurality of antenna elements (a) configured to emit respective signals of radar radiation in respective optical paths that are in a direction that is normal to the antennal elements and (b) arranged so that the normals of the respective antenna elements are parallel to one another; and
one or more dielectric lenses (a) having a plurality of optical axes that are in different non-parallel directions than one another and (b) situated so that a respective portion of the one or more dielectric lenses, each having a respective one of the optical axes, is provided in each of the optical paths of the antenna elements, with the respective optical axis being at a non-zero degree angle relative to the respective normal of the respective antenna element in whose optical path the respective portion of the one or more dielectric lenses is provided, the one or more dielectric lenses thereby diffracting the emitted respective signals in different respective main beam directions.

2. The radar sensor of claim 1, wherein the respective main beam directions of the one or more dielectric lenses are at predefined angles relative to the normals of the respective antenna elements in whose optical paths the respective portions of the one or more dielectric lenses are arranged, the predefined angles being predefined by the distances of the respective antenna elements to a vertical plumb line of the circuit board which extends through respective lens centers of the respective portions of the one or more dielectric lenses.

3. The radar sensor of claim 1, wherein the portions of the one or more dielectric lenses include portions of two of the dielectric lenses whose optical axes are tilted in opposite directions with respect to the antenna normals.

4. The radar sensor of claim 1, wherein the one or more dielectric lenses include one or more cylinder lenses.

5. The radar sensor of claim 1, wherein the array of antenna elements are serially fed antenna elements.

6. The radar sensor of claim 1, further comprising, for each of at least one of the antenna elements, a respective reflector arranged to reflect parasitic emissions of the respective antenna element, that are emitted in a direction not parallel to the normal of the respective antenna element, towards the respective portion of the one or more dielectric lenses.

7. The radar sensor of claim 6, wherein the reflector has a metallic surface.

8. The radar sensor of claim 1, wherein the one or more dielectric lenses include Fresnel lenses.

9. The radar sensor of claim 1, wherein:
the plurality of antenna elements are transmission antennas; and
the radar sensor further comprises one or more bistatic receiving antennas situated on the circuit board in such a way that these receiving antennas have no dielectric lens in their optical paths.

10. The radar sensor of claim 9, wherein a plurality of the receiving antennas are situated along a line.

11. The radar sensor of claim 9, wherein a plurality of the receiving antennas are situated along a line oriented in the azimuth direction.

* * * * *